(12) United States Patent
Young

(10) Patent No.: US 6,586,087 B2
(45) Date of Patent: Jul. 1, 2003

(54) ARTICLES SEALED WITH GLASS

(75) Inventor: Dianna M. Young, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/068,684

(22) Filed: Feb. 6, 2002

(65) Prior Publication Data

US 2002/0103069 A1 Aug. 1, 2002

Related U.S. Application Data

(62) Division of application No. 09/585,135, filed on Jun. 1, 2000, now Pat. No. 6,391,809.
(60) Provisional application No. 60/174,011, filed on Dec. 30, 1999.

(51) Int. Cl.$^7$ ................ B23B 18/00; B23B 17/06; B23B 9/00; C03C 29/00
(52) U.S. Cl. ................ 428/323; 428/426; 428/428; 428/432; 65/42
(58) Field of Search ................ 501/57, 66, 69; 428/1.1, 630, 325, 426, 432, 428; 174/50.5; 65/17.1, 30.1, 42, 59.1; 257/700, 701, 703

(56) References Cited

U.S. PATENT DOCUMENTS

| | | | |
|---|---|---|---|
| 2,733,158 A | 1/1956 | Tiede | 106/50 |
| 2,849,338 A | 8/1958 | Whitehurst et al. | 117/126 |
| 3,414,465 A | 12/1968 | Baak et al. | 161/193 |
| 3,445,212 A | 5/1969 | Bishop | 65/59 |
| 3,451,579 A | 6/1969 | Bishop | 220/2.1 |
| 3,459,569 A | 8/1969 | Ellis | 106/52 |
| 3,498,876 A | 3/1970 | Baak et al. | 161/193 |
| 3,528,829 A | 9/1970 | Baak et al. | 106/52 |
| 3,639,113 A | 2/1972 | Aslanova et al. | 65/30 |
| 3,779,781 A | 12/1973 | Baak et al. | 106/52 |
| 3,790,460 A * | 2/1974 | Mochel | 428/410 |
| 3,902,881 A | 9/1975 | Pirooz | 65/30 |
| 3,984,252 A | 10/1976 | Kiefer | 106/54 |
| 4,004,936 A * | 1/1977 | Powell | 501/15 |
| 4,011,060 A * | 3/1977 | Berkenblit et al. | 65/134.4 |
| 4,186,023 A * | 1/1980 | Dumesnil et al. | 501/15 |
| 4,743,302 A * | 5/1988 | Dumesnil et al. | 106/1.23 |
| 4,775,647 A * | 10/1988 | Smith, III | 501/15 |
| 4,788,165 A | 11/1988 | Fong et al. | 501/66 |
| 4,801,488 A * | 1/1989 | Smith | 428/209 |
| 4,882,212 A * | 11/1989 | SinghDeo et al. | 428/76 |
| 5,024,883 A * | 6/1991 | SinghDeo et al. | 428/323 |
| 5,510,300 A * | 4/1996 | Lim et al. | 501/18 |
| 5,622,551 A * | 4/1997 | Erbe et al. | 106/35 |
| 6,342,460 B1 * | 1/2002 | Akimoto et al. | 501/55 |

* cited by examiner

*Primary Examiner*—Tom Dunn
*Assistant Examiner*—Colleen P. Cooke
(74) *Attorney, Agent, or Firm*—Vincent T. Kung

(57) ABSTRACT

An article of manufacture that has a component capable of being sealed with a copper aluminosilicate glass. The sealing glass has a coefficient of thermal expansion (CTEs) of in the range between 20–82×10-7/° C., over a range of 25–500° C.) and a softening points in the range of 660–1000° C. The glass has a composition consisting essentially, in terms of weight percent on an oxide basis, of 35–68 $SiO_2$, 3–25 $Al_2O_3$, 2–26 $B_2O_3$, 0–20 $R_2O$, 0–30 RO, 2–33 CuO, 0–4 F, 0–10 $M_xO_y$, where $R_2O$ is an alkali oxide selected from the group consisting of $Li_2O$, $Na_2O$, and $K_2O$, and RO is an alkaline earth oxide selected from the group consisting of CaO, MgO, ZnO, SrO, and BaO, and $M_xO_y$ is a transition metal oxide selected from the group consisting of $Co_2O_3$, $TiO_2$, NiO, $MnO_2$, and $Fe_2O_3$. The present invention also pertains to a method of sealing the article.

21 Claims, 3 Drawing Sheets

ARTICLES SEALED WITH GLASS

PRIORITY CLAIM

The present application is a divisional that claims the benefit of priority from U.S. Provisional Application, Ser. No. 60/174,011, entitled COPPER ALUMINOSILICATE GLASSES, which was filed on Dec. 30, 1999, and from U.S. patent application Ser. No. 09/585,135, now U.S. Pat. No. 6,391,809 which was filed on Jun. 1, 2000. The contents of the aforementioned applications are incorporated herein by reference.

BACKGROUND OF THE INVENTION

The present invention pertains to articles made from materials (e.g., borosilicate glasses or glass-ceramics) that are suited to be sealed using a copper aluminosilicate glass. The joining of component parts together by means of a fused glass seal to form a composite article is a well-cultivated art. In particular, numerous special sealing glasses have been developed for use in joining glass parts with each other, or with metals, alloys, or ceramics. In making a fusion-type seal, the sealing material must be heated to a temperature where it becomes soft enough to wet the sealing surface and form an adhesive, hermetic bond.

The type of glass used in forming a fusion-type seal varies according to the desired properties of the article being sealed. For many purposes, manufacturers want to keep the softening temperature (softening point) as low as possible, while also maintaining a low to medium coefficient of thermal expansion (CTE). This is particularly true for lamp work having electrical and electronic articles where thermally sensitive parts or coatings are commonly used.

Typically, electrical lamps employ borosilicate glass envelopes or bulbs and require joining or sealing of these envelopes to either another piece of glass or metal (usually electrodes) to achieve hermeticity within the glass vessel. Borosilicate glass has a coefficient of thermal expansion (CTE) of $30-40 \times 10^{-7}/°$ C. The normal CTE for borosilicate lamp glasses, such as Pyrex® by Corning, is $38 \times 10^{-7}/°$ C. The elements enclosed in the glass vessel may include phosphor coatings (fluorescent lamps), metal electrodes, or metallic reflective coatings. Coatings and electrodes require a hermetic environment, otherwise their properties diminish, and as a result the lifetime of the device is dramatically shortened. The coatings elements, however, are typically sensitive to relatively high temperatures, especially greater than 600° C., and thus sealing temperatures must be maintained low, and processing times must be maintained short to avoid decomposition or degradation of these components.

The current workable sealing glasses used in lamps of the type described above are phosphate based frits. Phosphate frits have the advantage of low softening points and, hence, are considered low temperature sealing glasses. Solder glasses currently available can be classified in two categories: 1) leaded phosphate sealing glasses and 2) non-leaded phosphate sealing glasses. Both categories contain compositions that can be classified as vitreous or crystallized, in which crystallized sealing glasses are resistant to deformation under the conditions of reheating in vacuum—an advantage, for example, in television manufacture applications. In the prior art, medium expansion of sealing glasses is established typically by adding low expansion fillers (usually cordierite, lithium alumino-silicate glass-ceramics, or crystalline cobalt pyrophosphate, or magnesium pyrophosphate) to relatively high expansion base glass compositions ($60-120 \times 10^{-7}/°$ C.) that have a relatively low softening points (350–400° C.).

The two categories of phosphate sealing glasses mentioned above, however, suffer from a number of disadvantages. First, as stated before, to bring down the CTE, phosphate glasses require adding substantial amounts of fillers. The fillers can add significantly to the overall cost of the glass frit. Second, the addition of filler mandates that the sealing glass be used in a powdered form, which is less desirable for tubular geometries. Third, these phosphate frits tend to create seals that are not consistently heremetic when used to seal borosilicate glass, particularly when a desired application calls for the use of a tube geometry. Phosphate glass frits by their inherent nature need to be used in either a dry powder or paste form. Air permeates the seal because the frit powder or paste does not densify completely. Gaps and pores often will appear during the sintering process as the organic binders in the paste de-gas when burned-out under high temperatures. Additionally, as the phosphate frit melts, the glass tends to flow under gravity towards the bottom. Even though, phosphate frits can seal flat glass applications without much problems, some gaps or pores, however small, will always exist between the frit particles in complex geometric applications aside from flat glasses. Moreover, it is difficult to cover or seal certain geometric configurations, such as round or cylindrical forms with loose powder or even paste. Since sealing glasses used in the powdered form is susceptible to porosity within the seal, hermeticity is harder to achieve in the seal.

At the present time, a need for improvement continues to be unsatisfied in the medium-expansion sealing/solder glass industry, especially in seals for electrical lamp constructions such as photoflash lamps, vehicle headlamps and lamps for fluorescent lighting. If one has to use a solder glass to join together various glass articles or pieces that are characterized as having medium expansion, one has limited options.

Sealing glasses composed essentially of copper aluminum and silicon oxides are also known in the art. In contrast to phosphate glasses, these copper glasses have low to medium coefficients of thermal expansion that typically do not exceed $20 \times 10^{-7}/°$ C., but rather are lower than $10 \times 10^{-7}/°$ C., over a broad temperature range. Briefly studied in the 1960s and early 1970s, this property made copper aluminosilicates a favored type of sealing glass for joining fused silica, fused quartz, and other low-expansion glass and glass-ceramics materials.

To illustrate, the following patents describe some of the qualities and applications of copper sealing glasses that are known. U.S. Pat. No. 3,414,465 (Baak et al.) discloses a copper sealing glass used for forming fused quartz to fused quartz seals and fused silica-to fused silica seals. The glass has a composition of 50–90 mol % $SiO_2$, 5–30 mol % $Al_2O_3$, 5–30 mol % $Cu_2O$, 0–6 mol % NiO, 0–6 mol % $Fe_2O_3$, and 0–6 mol % $AlF_3$. The '465 patent describes the copper sealing glasses composition as generally having a coefficient of linear thermal expansion of not more than about $10 \times 10^{-7}/°$ C. in the temperature range of 0–300° C.

U.S. Pat. No. 3,445,212 (Bishop) teaches a method of sealing a copper lead-in conductor to a surface of a low-expansion silica containing material using a reduced copper sealing glass. The sealing glass is selected from the group of glasses consisting of 75–80 mol % $SiO_2$, 8–12 mol % $Al_2O_3$, 10–15 mol % $Cu_2O$, and a glass consist 75–80 mol % $SiO_2$, 8–12 mol % $Al_2O_3$, 10–15 mol % $Cu_2O$, and 1–3 mol % $AlF_3$. The glass composition described in the '212 patent is designed to seal low expansion ceramic, fused quartz or silica bodies with a coefficient of expansion of about $20 \times 10^{-7}/°$ C. or preferably less in the temperature range of 0–300° C.

U.S. Pat. No. 3,451,579 (Bishop) discloses a vitreous solder glass composition for bonding a fused silica window to a ceramic body lamp, the composition consisting of 75–80 mol % $SiO_2$, 8–12 mol % $Al_2O_3$, 10–15 mol % $Cu_2O$. The '579 patent further discloses a sealing glass consisting of 75–80 mol % $SiO_2$, 8–12 mol % $Al_2O_3$, 10–15 mol % $Cu_2O$, and 1–3 mol % $AlF_3$, with a coefficient of expansion of $4-10 \times 10^{-7}/°$ C. over the temperature range of 0–300° C.

U.S. Pat. No. 3,459,569 (Ellis) discloses glass compositions for sealing and decorating low expansion glass-ceramic materials and borosilicate type glasses. The glass compositions contain 55–70 mol % $SiO_2$, 6–10 mol % $Al_2O_3$, 0–2.5 mol % $MnO_2$, 0–3 mol % $Fe_2O_3$, 5–12 mol % $Cu_2O$, and 10–22 mol % $Li_2O$.

U.S. Pat. No. 3,498,876 (Baak et al.) describes copper-zinc alumino-silicate glasses for sealing with low thermal expansion materials such as fused quartz and fused silica. The glasses have compositions consisting essentially of 50–94 mol % $SiO_2$, 0.5–30 mol % $Al_2O_3$, 1.5–35 total mol % $Cu_2O$ and CuO, and 0.5–20 mol % ZnO; and generally exhibit coefficients of thermal expansion that are not greater than $15 \times 10^{-7}/°$ C. over the temperature range of 0–300° C.

U.S. Pat. No. 3,528,829 (Baak et al.) reveals glasses that contain copper and are useful for sealing fused quartz, as well as ceramics, metals and related materials. These glasses have compositions consisting essentially of 72–85 mol % $SiO_2$, 2–15 mol % $Al_2O_3$, 2–15 mol % $Cu_2O$, and 1–10 mol % ZnO. The glass composition has a coefficient of thermal expansion of about $10-11 \times 10^{-7}/°$ C. in the temperature range of 0–300° C.

U.S. Pat. No. 3,779,781 (Baak et al.) describes copper alumino-silicate glass compositions containing as essential components 50–94 mol % $SiO_2$, 0.5–30 mol % $Al_2O_3$, 1.5–35 mol % $Cu_2O$, where there is at least 60 mol % silica in ternary compositions. The glasses disclosed are useful as sealing glasses, particularly for fused quartz, since they have a relatively low melting point and coefficients of thermal expansion less than $10 \times 10^{-7}/°$ C. or less over the temperature range of 0–300° C.

Commercially available copper alumino-silicate sealing glasses have been tested and found to be wanting for sealing borosilicates or other glass systems of medium expansion. Although they form a rigid vitreous seal, these glasses exhibit a tendency to have softening points in excess of 900° C. This means that these glasses require high sealing temperatures, which are not only difficult to control, but also will damage, if not decompose, temperature sensitive electrical components in the articles or devices, such as lamps, to be sealed. Further, these glasses require melting temperatures over 1500° C., and have coefficients of thermal expansion that tend to be lower than desired.

Consequentially, a need to formulate a type of sealing glass, without the shortcomings of phosphate glasses, but with relatively low softening points and low-medium to high coefficients of thermal expansion, especially suited for borosilicate glasses, continues until the present time. This need has prompted us to further experiment and produce the present, inventive glass compositions.

BRIEF SUMMARY OF THE INVENTION

The present invention comprises a copper alumino-silicate glass composition that can better serve as a sealing material for borosilicate articles or other glass systems of medium expansion because of the composition's comparable thermal expansion at low temperatures. Another advantageous feature of the inventive glass composition is the relatively low softening point. The inventive glasses can be sealed at such temperatures and within such times as that it will not cause decomposition or degradation to temperature sensitive components, such as coatings and electrodes in electrical lamps or other lighting devices. Additionally, unlike phosphate frits, the present invention provides a sealing glass that may be used both in frit powder form or solid, nonporous, glass bodies of various geometries, such as disks, washers, canes, or tubes. These and other aspects, features and advantages of these inventions will become evident form the following detailed description of the invention.

One aspect of the inventive copper alumino-silicate glasses has coefficients of thermal expansion (CTEs) between $20-82 \times 10^{-7}/°$ C. (over a range of 25–500° C.) and softening points between 660–1000° C. These characteristics make the new glass composition suitable for use as a sealing glass, especially for borosilicate glasses since the inventive composition have relatively comparable or similar, and inclusive coefficients of thermal expansion with borosilicates. The present glass compositions, in terms of weight percent on an oxide basis, consist essentially of: 35–68 $SiO_2$, 3–25 $Al_2O_3$, 2–26 $B_2O_3$, 2–33 CuO, 0–20 $R_2O$, 0–30 RO, 0–4 F, 0–10 $M_xO_y$, where $R_2O$ is an alkali oxide selected from the group consisting of $Li_2O$, $Na_2O$, $K_2O$, and RO is an alkaline earth oxide selected from the group consisting of CaO, MgO, ZnO, SrO, BaO, and $M_xO_y$ is a transition metal oxide selected from the group consisting of $Co_2O_3$, $TiO_2$, NiO, $MnO_2$, and $Fe_2O_3$. A preferred composition range consists essentially, in terms of weight percent on an oxide basis, of: 61–67 $SiO_2$, 3–5 $Al_2O_3$, 22–26 $B_2O_3$, 3–9 CuO, 1–4 $R_2O$, 0.1–4 F, where $R_2O$ is an alkali oxide selected from the group consisting of $Li_2O$, $Na_2O$, $K_2O$.

DETAILED DESCRIPTION OF THE INVENTION

Figure 1:
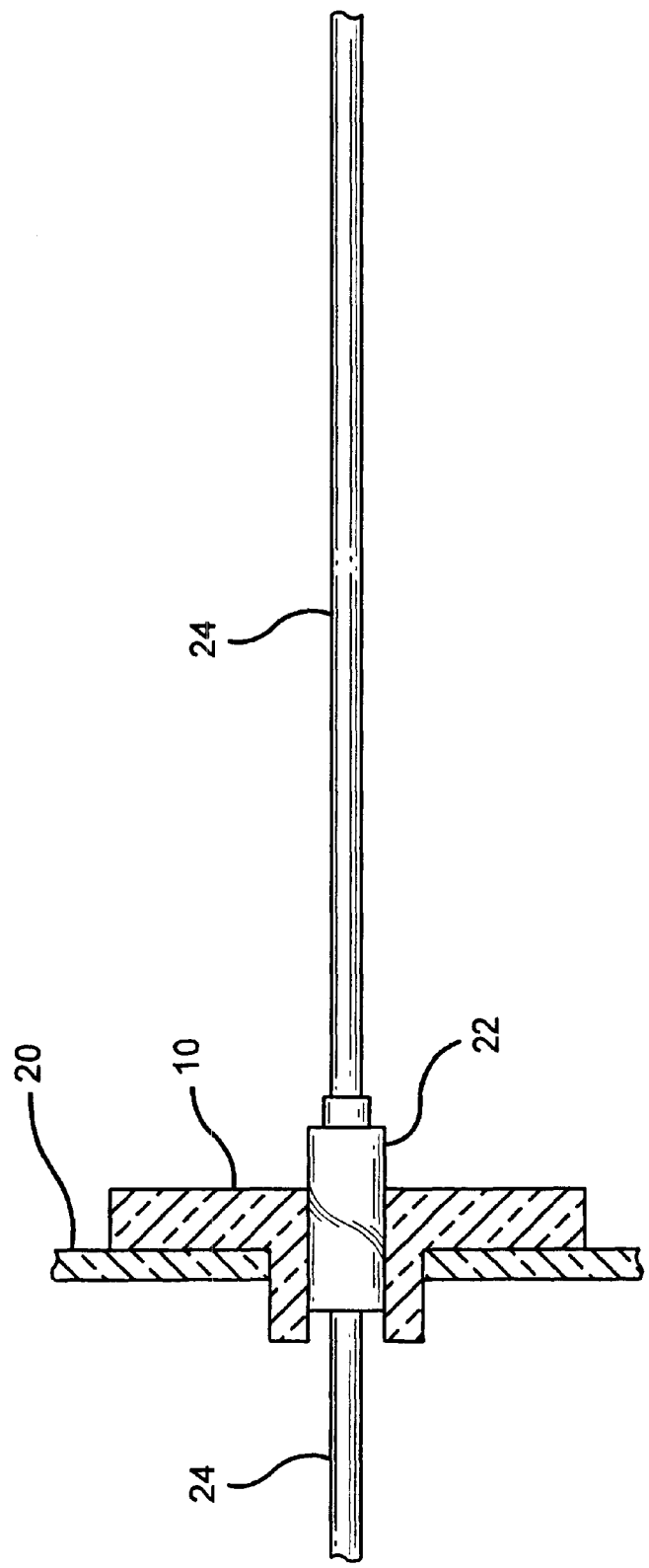
FIG. 1. A schematic, cross-sectional view of a hermetic seal made using a solder glass perform ring with a glass beaded electrode wire lead.

In contrast to copper alumino-silicate glasses that in the past have CTEs typically lower than $10 \times 10^{-7}/°$ C., recent work has produced copper alumino-silicates, with higher coefficients of thermal expansion and softening points less than 900° C. These copper glasses are used to sealing glasses for telecommunication devices, as described in U.S. patent application Ser. No. 09/364,141, herein incorporated in its entirety by reference. Nonetheless, the CTEs of these glasses still remained less than $20 \times 10^{-7}/°$ C. From that study evolved a search for copper alumino-silicate glasses that would be more effective as sealing glasses for a gamut of glasses with low-medium to high thermal expansions. The present invention is a result. The inventive copper alumino-silicate glasses exhibit CTEs in the range of $20-82 \times 10^{-7}/°$ C. We believe that the inventive glass compositions are more suited for sealing borosilicate glasses that have CTEs in the range of $30-40 \times 10^{-7}/°$ C., as well as, any other glass system having a low-medium to high CTE within the range of $20-82 \times 10^{-7}/°$ C. , (e.g.: Code #1723 an alumino-silicate, #8082, #8083, #8087 lead silicates, #8088 a borate, all of which are commercially available from Corning Inc.).

We discovered that by substituting alkali oxides or alkaline earth oxides for copper in the composition of the glasses, the coefficient of thermal expansion for copper alumino-silicate glass could be raised to a desired value that can match the CTE of a material to be sealed, such as borosilicates. This characteristic is an important feature of the present invention. The alkali or alkaline earth oxides, along with boric oxide and fluorine, serve principally as glass network modifiers, which lowers the softening point of the glass and promotes fluxing. The alkali metal cations disrupt the highly covalent silicon-oxide network where covalent linkages are partially removed or destroyed. The overall effect is to weaken the network structure. The positively charged interstitial regions counter-balance the negatively charged network regions of the silicon-oxide. With the addition of fluorine, we terminate some of the continuous network structure by breaking the silicon-oxygen bonds. This lowers the softening temperatures of the different embodiments of the inventive glass composition. Additionally, even though boric oxide is present in the composition as a network former, boric oxide can still act as a softener for alumino-silicate glasses. Because boron is only trigonally bound to the network, as contrasted to the tetrahedral bond of silicate, the network that boric oxide produces is easier to disrupt than a network formed from silicate.

The copper aluminosilicate sealing glasses of the present invention, as calculated on an oxide basis in weight percent, consist essentially of: 35–68% $SiO_2$, 3 –25% $Al_2O_3$, 2–26% $B_2O_3$, about 2–33% CuO, 0–20% $R_2O$, 0–30% RO, 0–10% $M_xO_y$, where $R_2O$ is an alkali oxide selected from the group consisting of $Na_2O$, $Li_2O$, $K_2O$, and RO is an alkaline earth oxide selected from the group consisting of CaO, MgO, ZnO, SrO, BaO, and $M_xO_y$ is a transition metal oxide selected from the group consisting of $Co_2O_3$ $TiO_2$, NiO, $MnO_2$ and $Fe_2O_3$. The glasses of the present invention exhibit CTEs in the range of $20–82 \times 10^{-7}/°$ C. over the temperature range of 25–500° C., and have softening points on the order of 660–1000° C. Although these softening points are higher than the temperatures at which degradation and decomposition in lamp components take place (i.e., about 600° C.), the present inventive glasses are still suitable as sealing glasses.

In all sealing applications the solder glass is used to provide a hermetic seal to replace the more traditional method of glass-to-glass flame sealing, which requires pre-heating of parts to elevate temperatures above the anneal point of the glass (>550° C.). In lamps that are phosphor coated, an embodiment of lighting devices that would likely incorporate the inventive glasses in their manufacture, we desire to keep the phosphor coating from damage. Thus, it is more advantageous to limit prolonged exposure of the lamp body to elevated temperatures.

Even though the copper solder glasses can either be heated using traditional convection heating or heated locally, we discovered that the glasses of the present invention sealed faster when we use small area sealing techniques. The glasses melted more quickly when subjected to infrared (IR) irradiation or any other source that emits long wavelength energy of one micron or longer, such as a pin-point sealing $CO_2$ laser, hydrogen/oxygen flame, or their equivalents. In these techniques, quick melting minimizes heat flow to the rest of the article being sealed. During the soldering process, we apply heat energy in a direct, concentrated and intense fashion to a small portion of the article, at the solder joint where the inventive sealing glasses will be melted. The inventive sealing glass being irradiated at that portion absorbs the irradiation more efficiently, and heats faster than the rest of the glass of the article, which induces faster melting of the sealing glass and sealing of the article. While the temperature of the small area that had the heating source focused upon it rises and becomes hot enough to melt, the rest of the glass article containing the electrical lamp and its electrical components remains relatively cool. Those sensitive components and their surrounding glass structures in the article are protected and exposed to the least amount of heat necessary during the soldering process. For example, because the substrate glass that forms the envelope of an electrical lamp is a different type of glass, such as borosilicate, than the leaded copper sealing glass, which has a particular affinity to long-wavelength energy heating, the envelope does not absorb long wavelengths such as infrared. Thus, the lamp and electrical components are not heated to the point where degradation and decomposition can even begin to occur.

Not intending to be bound by theory, we believe that the lower melting temperature of the inventive glasses, described above, is a function of the composition and particularly due to the copper being in the glass. The glasses contain both cupric, $Cu^{2+}$, and cuprous copper ions, $Cu^{1+}$. Both types of copper ions absorb in the infrared wavelengths. Because the copper ions are more easily excited by electromagnetic waves having wavelengths of one micron or longer, the new copper glasses absorb infrared irradiation more efficiently than the substrate glass that forms the lamp envelope. For this reason, copper ions aid in the absorption of long wavelengths used in spot heating the sealing glass during the soldering process. The lamp envelope glass does not readily absorb at one micron, or absorbs very little at that wavelength.

As mentioned before, the currently workable glasses used in sealing lamps made of borosilicates are phosphate based frits. In contrast to the shortcomings of phosphate sealing glasses, the inventive copper aluminosilicate glasses can be manipulated into various physical forms, a novel feature of the invention. They may be formed into solid geometries, such as bulk glass, disks, washers, drawn as cane, tubes, ribbon, or fiber, as well as pulverized to into conventional glass sealing frit powder. Being able to use the glass in various forms permits maximum flexibility for us to accommodate complex geometries when glass sealing of electrical lamps or optical components. Using the inventive copper glass in the form of bulk glass, disks, washer, cane, tubing, fiber, or ribbon not only eliminates the problems associated with sintering conventional frit powder applications, because the sealing glass can conform to the shape of the required seal, but it can also minimize or even eliminate the pores that are left within the seal as a natural consequence when frit powder is melted. Hence, we more readily achieve hermeticity of the seal.

These properties are optimized in a family of preferred compositions, again in weight percent on a calculated oxide basis, that consist essentially of: 61–67% $SiO_2$, 3 –5% $Al_2O_3$, 22–26% $B_2O_3$, 3–9% CuO, 1–4% $R_2O$, 0.05–4% F, where $R_2O$ is an alkali oxide selected from the group consisting of $Li_2O$, $Na_2O$, $K_2O$. These preferred copper aluminosilicate glasses have CTEs in the range of $36–40 \times 10^{-7}/°$ C. over the temperature range of 25–500° C., and softening points of about 600–750° C.

When we prepared the glass compositions of the present invention, we formulated and mixed batches of glass in conventional manner. The batch ingredients were compounded, and thoroughly mixed together to secure a homogeneous melt. We melted each batch of the starting compounds, in their respective proportions, in silica crucibles at temperatures ranging from 1200–1500° C. for 4 hours in an electric furnace. At the end of the four hours, we poured the glass melt onto steel plates to provide the test pieces for physical analysis. These glass pieces were transferred and annealed at temperatures ranging from 400–500° C. The glasses produced by this process exhibited a dark green to blackish color. Table A. summarizes several examples of the glass compositions of the present invention, where the respective amounts of the starting oxides are specified, and the respective coefficient of thermal expansion and resulting softening points are reported. These examples are merely illustrative and not to be construed as limiting the invention.

TABLE A

Copper alumino-silicate Compositions, CTE & Softening Point Oxides (wt %)

| Example No. | $SiO_2$ | $Al_2O_3$ | $B_2O_3$ | CuO | $R_2O$ | F | CTE ($\alpha \times 10^{-7}/$ ° C.) | Soft. Pt. (° C.) |
|---|---|---|---|---|---|---|---|---|
| 1. | 67.2 | 3.21 | 23.9 | 2.51 | 3.91 ($Na_2O$) | — | 37.2 | 704 |
| 2. | 64.9 | 3.10 | 22.3 | 2.42 | 3.77 ($Na_2O$) | 3.43 | 39.7 | 689 |
| 3. | 61.7 | 3.41 | 24.9 | 6.05 | 3.77 ($Na_2O$) | — | 40.0 | 703 |
| 4. | 61.6 | 3.41 | 24.8 | 7.25 | 3.77 ($Na_2O$) | — | 37.8 | 721 |
| 5. | 61.4 | 3.40 | 24.8 | 8.43 | 1.88 ($Na_2O$) | — | 34.6 | 692 |
| 6. | 62.7 | 3.47 | 25.3 | 3.69 | 3.83 ($Na_2O$) 0.92 ($Li_2O$) | — | 41.4 | 688 |
| 7. | 63.0 | 3.49 | 25.4 | 3.71 | 2.89 ($Na_2O$) 1.39 ($Li_2O$) | — | 39.3 | 702 |
| 8. | 63.3 | 3.50 | 25.5 | 3.73 | 1.94 ($Na_2O$) 1.87 ($Li_2O$) | — | 38.8 | 718 |
| 9. | 64.0 | 3.54 | 25.8 | 3.76 | 2.83 ($Li_2O$) | — | 36.0 | 682 |

Persons working in the art can recognize that, whereas the process described above is directed toward laboratory activity, the glasses operable in the invention can be melted in large commercial melting units and formed into desired shapes by conventional glass melting and forming practices. The compositions need to be fired at sufficiently high temperatures and for a sufficient period of time to produce a homogeneous melt. Thereafter, the melt can be cooled and simultaneously shaped into a glass perform that is annealed and prepared for use as a seal.

Figure 2:
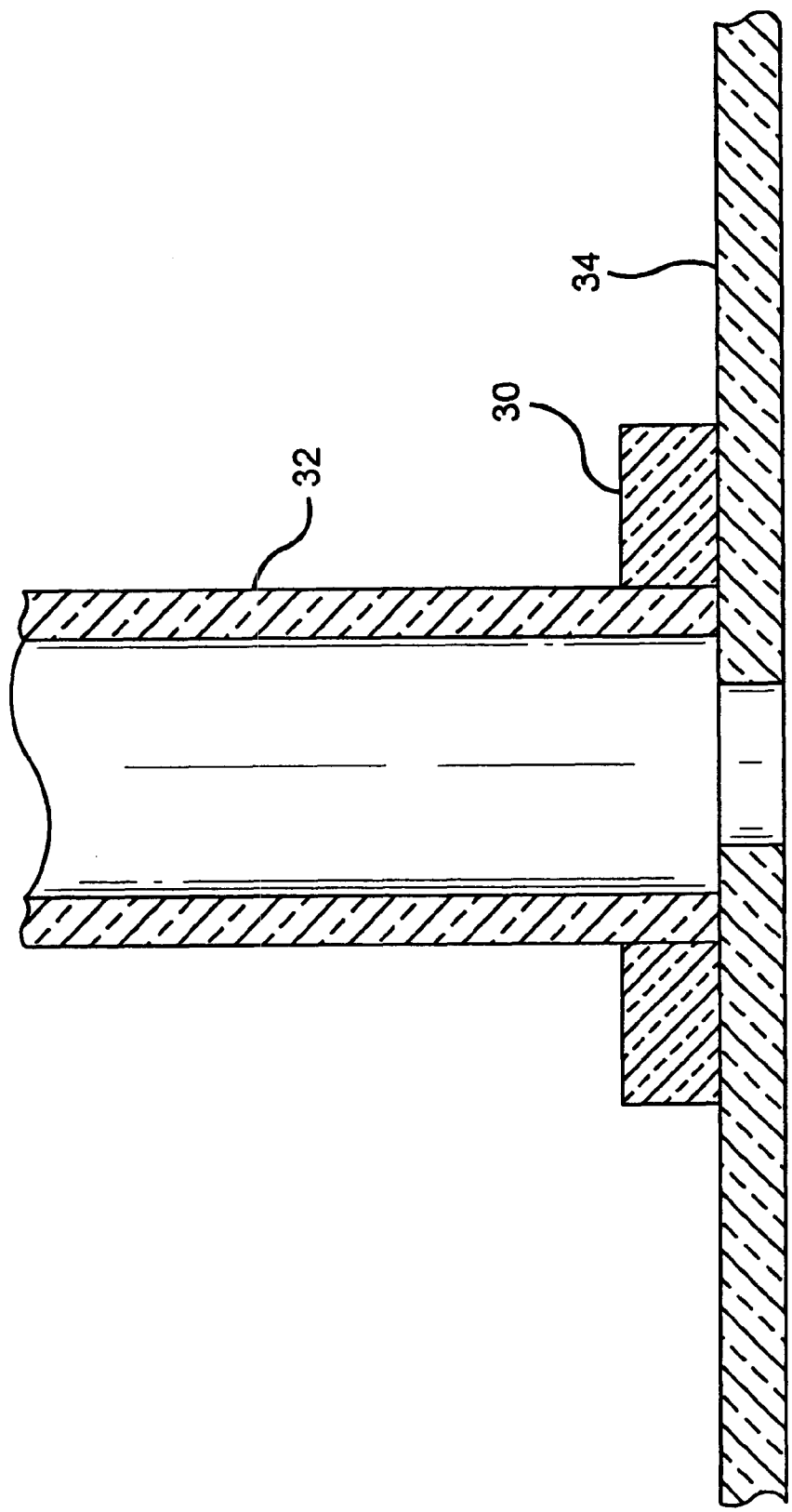
FIG. 2. A schematic, cross-sectional view of a tubulation seal made using a solder glass perform washer.
Figure 3:
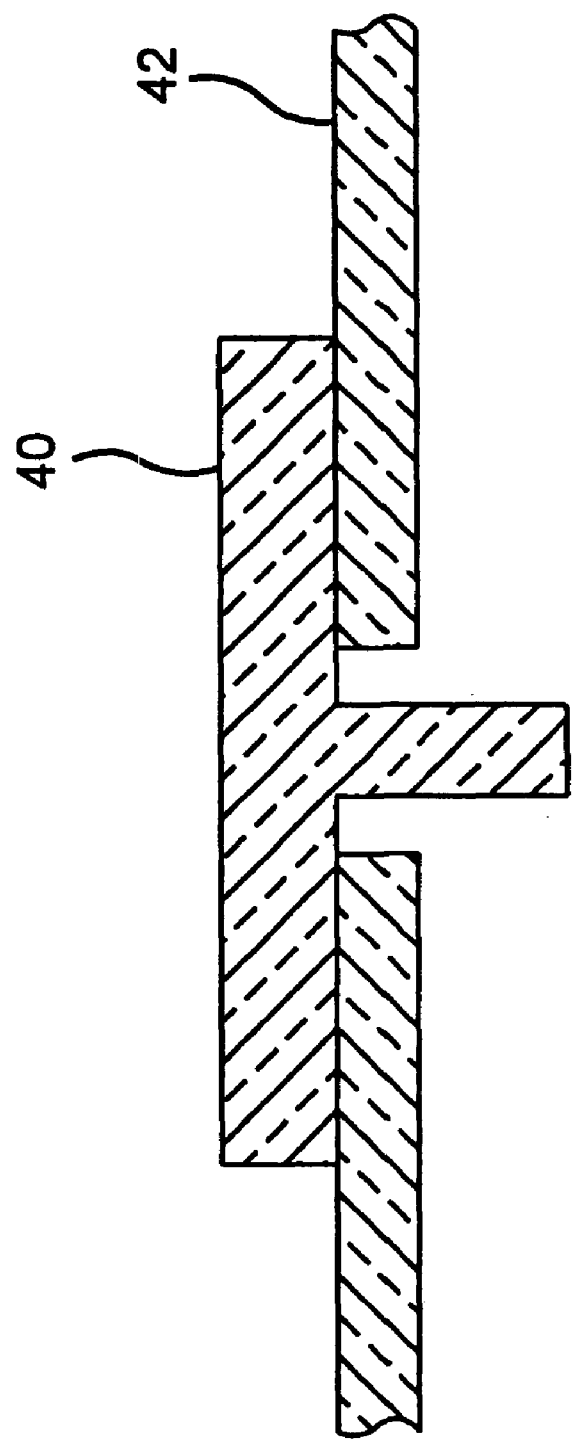
FIG. 3. A schematic, cross sectional view of a plug seal made using a solder glass perform plug.

FIGS. 1 through 3 exemplify in schematic drawings a few of the many different uses for hermetic sealing, which we have experimented, of the inventive glass composition. The illustrations show cross-sectional views of "perform" shapes in various geometries as the glass seals could look like prior to heating and subsequent "flow" to produce the hermetic seal. The material can also be in "paste" form to do the same thing, but as discussed earlier, the inventive glasses permitted solid forms an easier task to draw in geometrical shapes. FIG. 1 shows in cross-section a hermetic seal for an electrode. The seal is made by using a solder glass perform ring (10) that fits against a glass wall (20) and a glass (bead) sleeve (22) with an electrode lead wire (24) passing through it. This type of seal is currently being used in lighting articles and devices such as vacuum lamps (incandescent, fluorescent, HID), and may be usable in the art of telecommunication devices or opto-photonic components in the foreseeable future. FIG. 2 illustrates an example of a tubulation seal made using a solder glass perform washer-ring (30). This type of seal joins a glass tube (32) with a glass wall (34) of an article or device. To illustrate a use of this kind of seal, during lamp processing, exhaust tubulations of typical vacuum lamps are used for the purpose of providing a temporary connection to an exhaust machine. During a typical exhaust process, a lamp is evacuated and back-filled with inert gas through the exhaust tube. As a final step, the exhaust tube is heated (tipped-off) by flame and the lamp removed, resulting in a hermetically sealed lamp. FIG. 3 shows a simple plug seal made using a solder glass perform plug (40) of an opening in the glass wall (42) of an article or device. Plug seals can be used in flat panel displays (FPD), for example, where lamps are processed without exhaust tubulations in a vacuum chamber. Flat panel displays have become quite prevalent as substrates in liquid crystal display devices and the emerging flat TV technologies. A plug seal provides a means of hermetically sealing the FPD after evacuating and back-filling. In some cases, the inventive glass is particularly adaptive as a solder glass to hermetically seal holes after phosphor filling and draining.

The inventive copper glasses described herein are suitable for sealing a variety of medium expansion glasses, where borosilicates are a primary example. Nonetheless, any medium expansion glass (e.g., aluminosilicates, silicates, lead silicates) or glass-ceramic materials could be also sealed with these copper glass compositions, using the various physical forms into which the glass can be molded. Although the present invention has been fully described by way of examples, it is to be noted that various changes and modifications will be apparent to those skilled in the art. Therefore, unless otherwise such changes and modifications depart from the scope of the present invention, they should be construed as included therein.

What is claimed is:

1. An article of manufacture comprising a seal made of copper aluminosilicate glass, said glass having a medium coefficient of thermal expansion (CTE) over a temperature range of 25–500° C., and said article is made from a material having a CTE that is compatible with said glass.

2. The article according to claim 1, wherein said article contains temperature sensitive components.

3. The article according to claim 2, wherein said article contains electronic or electrical components.

4. The article according to claim 1, wherein said article is either a component of or is a device including: optical components, lighting devices, telecommunication devices, flat panel display devices, or liquid crystal display devices.

5. The article according to claim 1, wherein said article is made from materials consisting essentially of: borosilicates, aluminosilicates, silicates, lead silicates, glass ceramic materials, or high strain-point glass-ceramic materials.

6. The article according to claim 1, wherein said copper aluminosilicate glass has a composition, as expressed in weight percent, consisting essentially of:

| $SiO_2$ | 35–68% |
|---|---|
| $Al_2O_3$ | 3–25 |
| $B_2O_3$ | 2–26 |

-continued

| | |
|---|---|
| $R_2O$ | 0–20 |
| RO | 0–30 |
| CuO | 2–33 |
| F | 0.05–4 |
| $M_xO_y$ | 0–10 | where $R_2O$ is an alkali oxide selected from the group consisting of $Li_2O$, $Na_2O$, $K_2O$, RO is an alkaline earth oxide selected from the group consisting of CaO, MgO, ZnO, SrO, BaO, and $M_xO_y$ is a transition metal oxide selected from the group consisting of $Co_2O_3$, TiO2, NiO, $MnO_2$, and $Fe_2O_3$.

7. The article according to claim 1, wherein said glass has a coefficient of thermal expansion (CTE) of $20-82 \times 10^{-7}/°$ C. over a temperature range of 25–500° C.

8. The article according to claim 6, wherein said glass has a softening point in the range of about 660–1000° C.

9. The article according to claim 6, wherein said glass has a softening point in the range of about 660–850° C.

10. The article according to claim 6, wherein said glass has a propensity to heat and wet when subject to infrared-irradiation.

11. The article according to claim 1, wherein said copper aluminosilicate glass has a composition, as expressed in weight percent, consists essentially of: about 61% to about 68% $SiO_2$; about 3% to about 5% $Al_2O_3$; about 21% to about 26% $B_2O_3$; about 3% to about 10% CuO; 0% to about 15% RO; 0.1% to about 4% F; and 1% to about 4% $R_2O$, where RO is an alkaline earth oxide selected from the group consisting of CaO, MgO, ZnO, SrO, BaO; $R_2O$ is an alkali oxide selected from the group consisting of $Li_2O$, $K_2O$, and $Na_2O$; and $M_xO_y$ is a transition metal oxide selected from the group consisting Of $Co_2O_3$, $TiO_2$, NiO, $MnO_2$, and $Fe_2O_3$; and said glass has a coefficient of thermal expansion (CTE) in the range of about $36-40 \times 10^{-7}/°$ C. over a temperature range of 25–500° C., and a softening point from about 660–750° C.

12. The article according to claim 11, wherein said glass composition, as expressed in weight percent on an oxide basis, consists essentially of: about 61% to about 67% $SiO_2$; about 3% to about 5% $Al_2O_3$; about 22% to about 26% $B_2O_3$; about 3% to about 10% CuO; 0.1% to about 4% F; and 1% to about 4% $R_2O$, where $R_2O$ is an alkali oxide selected from the group consisting of $Li_2O$, $K_2O$, and $Na_2O$.

13. The article according to claim 1, wherein said copper aluminosilicate glass has a composition, expressed in weight percent, consisting essentially of: 55–68% $SiO_2$; 3–15% $Al_2O_3$; 20–26% $B_2O_3$; 2.5–10% CuO; 0–15% RO; 0.05–4% F; and 1–4% $R_2O$, where RO is an alkaline earth oxide selected from the group consisting of CaO, MgO, ZnO, SrO, BaO; $R_2O$ is an alkali oxide selected from the group consisting of $Li_2O$, $K_2O$, and $Na_2O$; and $M_xO_y$ is a transition metal oxide selected from the group consisting of $Co_2O_3$, $TiO_2$, NiO, $MnO_2$, and $Fe_2O_3$.

14. The article according to claim 1, wherein said seal is made from a glass preform having a solid geometry other than a granular form.

15. The article according to claim 1, wherein said glass preform has a solid geometry including a bulk glass, disk, washer, cane, tube, ribbon, or fiber.

16. The article according to claim 1, wherein said seal is made from a glass frit in either a powder or paste consistency.

17. A method of sealing an article of manufacture comprising:
a) providing a copper aluminosilicate sealing glass with a coefficient of thermal expansion in the range of $20-82 \times 10^{-7}/°$ C. over a temperature range of 25–500° C., wherein said sealing glass has a preform with a geometry selected from either a non-granular solid or a granular solid;
b) providing an article that is made of a material having a coefficient of thermal expansion compatible with that of said sealing glass, and having at least one seal-able component;
c) applying said sealing glass to said seal-able component;
d) exposing said sealing glass to infrared irradiation having wavelengths of 1 micron or longer;
e) heating said sealing glass to the point of wetting.

18. The method according to claim 17, the method further comprising providing an article having at least a thermo-sensitive component; and soldering said sealing glass without decomposition or degradation of said thermo-sensitive component.

19. The method according to claim 17, wherein a non-granular solid of a bulk glass, disk, washer, cane, tube, ribbon, or fiber, or a granular solid of a frit with a powder or paste consistency is used.

20. The method according to claim 17, wherein said copper aluminosilicate glass has a composition, as expressed in weight percent, consisting essentially of:

| | |
|---|---|
| $SiO_2$ | 35–68% |
| $Al_2O_3$ | 3–25 |
| $B_2O_3$ | 2–26 |
| $R_2O$ | 0–20 |
| RO | 0–30 |
| CuO | 2–33 |
| F | 0.05–4 |
| $M_xO_y$ | 0–10 | where $R_2O$ is an alkali oxide selected from the group consisting of $Li_2O$, $Na_2O$, $K_2O$, RO is an alkaline earth oxide selected from the group consisting of CaO, MgO, ZnO, SrO, BaO, and $M_xO_y$ is a transition metal oxide selected from the group consisting of $Co_2O_3$, TiO2, NiO, $MnO_2$, and $Fe_2O_3$.

21. The method according to claim 17, wherein said glass has a softening point in the range of about 660–1000° C.

* * * * *